Patented Jan. 13, 1931

1,788,628

UNITED STATES PATENT OFFICE

HOLGER DE FINE OLIVARIUS, OF SAN FRANCISCO, CALIFORNIA, ASSIGNOR TO CALIFORNIA PACKING CORPORATION, OF SAN FRANCISCO, CALIFORNIA, A CORPORATION OF NEW YORK

PROCESS OF TREATING SUGAR SOLUTIONS

No Drawing. Original application filed December 22, 1925, Serial No. 76,965. Divided and this application filed December 27, 1927. Serial No. 242,961.

This invention relates to the treatment of sugar solutions and is particularly directed to the fermentation of impure sugar solutions. An object of this invention is to provide a method for the recovery of sucrose from impure sugar solutions. Another object is to disclose a method whereby impure sugar solutions may be treated for the recovery of sucrose by fermentation to remove invert sugars. Another object is to disclose a process whereby any yeast may be used in the fermentation of sugar solutions to remove invert sugar without materially inverting sucrose. Another object is to disclose a process of preparing impure sugar solutions for subsequent fermentation with any type of yeast without materially inverting sucrose. Another object is to disclose a process of preparing impure sugar solutions for fermentation of invert sugar contained therein without material inversion of sucrose so as to obviate the necessity of using pure cultures of special yeasts.

Other objects and advantages of this invention will become apparent from the following detailed description of a preferred process, although it is understood that minor changes may be made in the process as claimed, and the process may be adapted for use as a step in the treatment of sugar solutions by various other methods.

By sugar solutions is embraced all sugar solutions, whether derived from the cane, beet or other source and in various states of concentration. Most of the sugar solutions met in commerce are impure, i. e., the solutions contain mineral salts in solution, organic bodies and acids, proteins, gums, and various sugars and the like. My invention refers to such sugar solutions, syrups, molasses, massecuite, etc., and pertains to a process whereby said solutions and syrups may be treated for the recovery of sucrose contained therein. In the manufacture of sugar, as from the juice of the sugar cane, for example, sugar is crystallized from the sugar cane syrups until a residual liquid is obtained termed molasses, which contains sucrose but also contains melassigenic constituents, various impurities, and invert sugar. These impurities and particularly invert sugar prevent the crystallization of sucrose from the solution. This invention pertains to the treatment of molasses and other impure sugar solutions for the recovery of sucrose.

It has been known that sucrose could be recovered from cane molasses by first fermenting the molasses with pure cultures of selected yeasts such as those belonging to the pseudo-saccharomyces apiculatus group and which are substantially free from invertase (which is a soluble ferment capable of forming invert sugar from sucrose) thereby eliminating invert sugar present in the molasses without inverting sucrose. My prior Patent No. 1,401,433 granted December 27, 1921, discloses a fermentation process followed by treatment with alcohol, addition of lime to precipitate organic matter without precipitating the sucrose, separating the precipitate from the solution and then precipitating sucrose as lime saccharate. In my co-pending application Serial No. 76,965, filed December 22, 1925, I disclose a process in which a sugar solution is fermented, then mixed with alcohol, interfering organic and coloring matter precipitated with lime, the precipitate removed, the alcohol then removed and the sucrose then precipitated with an earthy metal, for example, with oxides or hydroxides of calcium, barium or strontium. This application may be said to be a division of my co-pending application, Serial No. 76,965.

It has been shown in the prior art that certain pure cultures of special yeasts such as the saccharomycetes have the power of fermenting invert sugar to alcohol without materially inverting sucrose. I have found that pure cultures of such special yeasts need not be used if the fermentation of the solution is carried out under certain specific conditions, and then any yeast may be used during this fermentation without substantial inversion of sucrose, i. e., yeasts not substantially free from invertase may be employed. The importance of my invention will become apparent if one conceives of the difficulty of maintaining a pure culture of yeast in the spore laden atmosphere of the tropical and semitropical countries which produce the major portion of the world's sugar. Contamination of pure cultures of special yeasts with "wild" yeasts under these conditions is practically certain, and it has been necessary heretofore to discard the yeasts soon after contamination and seed the fermenting tanks very frequently with new cultures of the pure invertase free yeasts.

Sugar solutions of the type treated by my process may contain sucrose, invert sugar, proteins, proteoses, amides, abino acids and other organic acids, gums and pectins, fibre particles, earthy matter and ash. The ash is composed of mineral salts and inorganic components such as potash, soda, lime, magnesia, silica, etc., in the form of phosphates, sulfates, carbonates, chlorides and other salts, some of which may have been combined with organic acids or a part of complex organic salts. The amount of mineral or inorganic constituents and other impurities in the sugar solutions will vary with the variety of sugar cane (if the solution is derived from this original source) the type of soil, kind of fertilizer, maturity of the cane and the stage of the sugar manufacturing process from which the sugar solution is obtained. For example, mother liquor or syrups after first crystallization of sugar contains a relatively smaller proportion of these mineral salts, and usually of invert sugar, than the final molasses. If a sugar solution is to be fermented, the proportion of mineral salts will be found to exert an inhibiting effect upon the fermenting action; some highly mineralized and impure molasses solutions, for example, do not ferment at all or very slowly. For this reason perhaps, it has been customary to use sugar solutions of about 18° to 20° Brix or dilute molasses to this concentration wherever such solutions were to be fermented for the elimination of invert sugar. This procedure necessarily results in the use of large volumes of solution and vaporization of large quantities of water before crystallization of sucrose. My process, as hereafter described more fully, obviates the use of large volumes of water and evaporation thereof.

I have found that when a sugar solution is brought to such concentration as to reduce the proportion of mineral salts below the concentration at which inhibition of fermentation takes place, but such concentration still maintained in a relatively high range, for example, above 35° Brix, fermentation of such sugar solutions for the elimination of invert sugar, dextrose laevulose and fructose can be accomplished, without substantial inversion of sucrose, by the use of any yeast. In other words, it is not necessary as heretofore to use special yeasts of the saccharomycetes group to cause elimination or fermentation of invert sugar without destroying or inverting sucrose, but any bakers, brewers, or other yeast, even when highly contaminated with "wild" yeasts will function properly under the conditions disclosed by me.

When a molasses solution originally of about 70° Brix (or higher) is to be treated for the recovery of sucrose, for example, I prefer to dilute such molasses to a concentration of between about 55° to 65° Brix, depending upon the proportion of ash and other impurities present, inoculate the solution with any yeast and then allow fermentation to take place under conditions known in the art. It will be found that the invert sugar will be eliminated or converted into alcohol while the sucrose will not be affected. The fermented solution is then in condition for further treatment in any desired manner for the recovery of the sucrose, for example, the process as disclosed by my copending application mentioned hereinbefore may be used.

When dilute impure sugar solutions are to be treated, for example, solutions of 20° Brix, it is desirable to first concentrate such solutions to about 35° or 40° Brix or higher, as at the lower concentrations only special yeasts such as pseudo-saccharomyces apiculatus, schizosaccharomycetes or other organisms of this type will cause elimination of invert sugar without inverting sucrose. After concentration to about 40° Brix or higher, the solutions may then be fermented in the presence of any yeast and although invert sugar will be destroyed, the sucrose will not be inverted as would be the case at lower concentrations.

This invention, therefore, utilizes a new step of bringing an impure sugar solution to a certain concentration at which the ability of any ordinary yeast to invert sugar, markedly slows up and becomes substantially negligible. This particular concentration is above 35° or 40° Brix but it is impossible to state such concentration more definitely as the effect is influenced by a number of variables such as concentration of mineral salts, composition of mineral salts, the temperature of fermentation, the particular type of yeast used, the number of generations the yeast has been stepped through, the pH or acidity of the solution, the percentage of purity or the relationship between the sugar solids and the total solids and the amount of invert sugar present, which influences the amount of alcohol formed. I have found, however, that often but a small increase in concentration of an impure sugar solution has a great effect upon the ability of yeast to invert sucrose and this unexpected change occurs at concentrations of above 35° Brix, approximately.

My process is particularly efficacious when the solutions to be fermented are slightly acid, as alkalinity, even in relatively small proportions, tends to cause the formation of other products than alcohol. Proteins and other nitrogenous constituents are preferably left in the solutions to be treated in order to support yeast growth. As a general rule, however, I have found that with a molasses of normal acidity and mineral salt content, inversion of sucrose takes place only very, very slowly at concentrations of 40° Brix while at 50° Brix it is of no commercial importance whatsoever.

By the term sugar solution as used herein I mean any sugar solution, syrup or molasses, or any mother liquor coming from the crystallization of sugar during its manufacture, whether it be the first, second or third mother liquid or a mixture of liquors and virgin juice or any by product sugar solution capable of being treated by my process. A portion of the impurities present in such sugar solutions may be removed before fermentation in accordance with my process for the elimination of invert sugar, or such impurities may be removed after said fermentation. It will be apparent that these and other modifications may be made without departing from the advantages of my invention and all such modifications as come within the scope of the claims are part of this invention.

I claim:

1. In a process of recovering sucrose from impure sugar solutions containing invert sugar, the steps of bringing the impure sugar solution to a concentration of between 35° and 65° Brix so as to allow subsequent fermentation of invert sugar to take place without material inversion of sucrose, and then fermenting said impure sugar solution without the aid of special selectively fermenting yeasts.

2. In a process of recovering sucrose from impure sugar solutions containing invert sugar, the steps of bringing the sugar solution to a concentration of over about 40° Brix but below 65° Brix, adding a yeast and fermenting the solution to eliminate invert sugar without material inversion of sucrose and without the aid of special cultures of yeasts of saccharomycetes apiculatus group.

3. A process of recovering sucrose from impure sugar solutions containing invert sugar comprising, bringing the impure sugar solution to a concentration of between 35 and 65° Brix so as to allow fermentation of the invert sugar to take place without the use of special cultures of yeasts not substantially free from invertase and then fermenting said solution in the presence of yeasts not substantially free from invertase.

4. In a process of recovering sucrose from impure sugar solutions containing invert sugar, the step of bringing the sugar solution to a concentration of over 35° Brix to allow subsequent fermentation of the solution to eliminate invert sugar without material inversion of sucrose and without the aid of special cultures of yeasts of the saccharomycetes apiculatus group, the concentration of the solution being below 65° Brix and below that at which mineral impurities inhibit fermentation.

5. A process of recovering sucrose from impure sugar solutions containing invert sugar, the step of bringing the sugar solution to a concentration of over 35° Brix to allow subsequent fermentation of the solution to eliminate invert sugar without material inversion of sucrose and without the aid of special cultures of yeasts of the saccharomycetes apiculatus group, the concentration of the solutions being below 70° Brix.

6. In a process of recovering sucrose from impure sugar solutions, the step of fermenting invert sugar in said impure sugar solution without material inversion of sucrose by adding a yeast other than that belonging to the saccharomycetes apiculatus group to an impure sugar solution having a concentration of approximately 65° Brix.

7. In a process of recovering sucrose from impure sugar solutions, the step of diluting an impure sugar solution with water to a concentration of between 35 and 70° Brix so as to allow fermentation of invert sugar to take place without material inversion of sucrose, adding a yeast other than that belonging to the saccharomycetes apiculatus group and then fermenting such diluted sugar solution.

8. A process of fermenting impure sugar solutions containing invert sugar in the presence of a yeast not substantially free from invertase, comprising adding water to a sugar solution containing mineral salts so as to bring the concentration of said solution to between about 35 and 65° Brix, whereby the fermentation inhibiting properties of said mineral salts are counteracted but not sufficiently to allow inversion of sucrose during subsequent fermentation, and then fermenting said solution in the presence of a yeast not substantially free from invertase.

9. In a process of recovering sucrose from impure sugar solutions containing invert sugar, the steps of bringing the impure sugar solution to a concentration of between 40 and 50 degrees Brix so as to allow subsequent fermentation of invert sugar to take place without material inversion of sucrose, and then fermenting said impure sugar solution without the aid of special selectively fermenting yeasts.

Signed at San Francisco, Calif., this 19th day of December, 1927.

HOLGER DE FINE OLIVARIUS.